United States Patent Office 2,974,042
Patented Mar. 7, 1961

2,974,042
DIAZOTYPE REPRODUCTION PROCESS

Oskar Süs, Wiesbaden-Biebrich, and Martin Glos, Wiesbaden, Germany, assignors, by mesne assignments, to Keuffel & Esser Company, Hoboken, N.J.

No Drawing. Filed June 19, 1957, Ser. No. 666,755

Claims priority, application Germany June 23, 1956

13 Claims. (Cl. 96—49)

This invention relates to the art of photosensitive diazotype materials. In this art, a diazo compound coated on a support is exposed to a light image. The diazo compound struck by light is destroyed and the remaining diazo compound is converted to an azo dye image by reacting it with an azo dye coupling component. Specifically, this invention relates to new azo dye coupling components for use in this process.

Only a few of the azo dye coupling components known for the production of azo dyestuffs have proved technically practicable for the purposes of diazotype processes. For the preparation of photoprints in dark colours there have, practically speaking, only been available a few polyhydroxy compounds of the benzene and naphthalene series; of these, phloroglucinol is one of the most commonly used coupling components of the benzene series and 2,3-dihydroxynaphthalene, and its derivatives, are most common in the case of the naphthalene series.

The monohydroxy compounds of the benzene series are less sensitive to oxygen than are the polyhydroxy compounds and would, therefore, prima facie be more suitable for the achievement of a stable white background. However, such monohydroxy compounds give only yellow to yellow-brown colours with the diazo compounds most commonly used in diazotype processes. The monohydroxy compounds of the naphthalene series, although giving brown-red shades, are insufficiently water-soluble unless there is a salt-forming group in the molecule.

It has now been found that reproductions by the diazotype process can be particularly advantageously obtained if the azo dye coupling component used is a thiophene substance in which a hydrogen atom of the thiophene molecule is substituted by a hydroxyl group and at least one of the remaining hydrogen atoms is otherwise substituted.

The present invention provides a diazotype process for the preparation of reproductions, in which thiophene compounds having a hydroxyl group and at least one further radical as substituents in the thiophene ring, are employed as azo dye coupling components.

Of particular importance amongst such hydroxythiophene compounds, are hydroxythiophene carboxylic acids, and methyl hydroxythiophene carboxylic acids, and their salts and carboxylic functional derivatives, such as esters and amides.

The invention is applicable to processes using one-component or two-component light-sensitive diazotype materials, and includes within its scope a two-component material, in which there is employed as an azo-coupling component a thiophene compound having a hydroxyl group and at least one further radical as substituents in the thiophene ring.

The hydroxythiophene compounds herein described can be dissolved together with a light sensitive diazo compound either in water or in organic solvents for application to a suitable support in producing two-component diazotype material. They are, therefore, equally suitable for application to paper and to hydrophobic supports, such as those made of cellulose acetate.

The use, as azo dye coupling components, of hydroxythiophene compounds, enables photoprints to be obtained by the two-component ("dry") process, having very good contrast. These components are among a very few which give a good deep brown image when used in the one-component, semi-wet process.

Hydroxythiophenes forming the object of this invention may be prepared by processes known from the literature or by methods analogous with such known processes.

It is surprising that despite their low molecular weight and the fact that they are monohydroxy compounds, when used as azo-coupling components for producing diazotype prints, hydroxythiophene compounds give deep blue-violet colours when used in conjunction with the p-amino diazo compounds that have particular practical importance in diazotype processes. It is also surprising that they are also capable of coupling very energetically with the diazo compounds derived from o-hydroxyamino-naphthalene sulphonic acids, which have for many years been used in diazotype processes and in particular with those known as naphthoquinone-(1,2)-diazide sulphonic acids—the coupling potential of which is but low—to give photoprints with red to deep brown-violet colours. The water-fastness of the dyestuffs thus formed is greatly increased if metal salts, e.g., nickel salts, are added to the coating solution. The only azo components that have hitherto proved practicable in combination with the last-mentioned group of diazo compounds for the production of diazotype prints are polyhydroxy compounds of the benzene series, of very high coupling potential such as phloroglucinol.

The invention is illustrated in the following specific examples but it is not intended to limit it thereto:

*Example 1*

A sensitizing solution is prepared by dissolving in 100 cc. of water a mixture consisting of 1.2 gms. of 2-hydroxy-5-methyl-thiophene-4-carboxylic acid (as coupling component)
0.6 gm. of citric acid
0.5 gm. of concentrated hydrochloric acid
2 gms. of thiourea
5 gms. of urea, and
2 gms. of naphthoquinone-(1,2)-diazide-(2)-5-sulphonic acid (sodium salt)

and then adding 2 gm. of nickel sulphate thereto. This sensitizing solution is coated on to a base paper and the coated paper is dried in conventional manner. After the light-sensitive coating has been exposed behind a master, the exposed paper is developed with ammonia vapour. A blue-violet positive image of the master is obtained.

*Example 2*

The same procedure as in Example 1 is followed, except that 1 gm. of 3-hydroxythiophene-5-carboxylic acid is used as the coupling component. After development, the copies obtained with the light-sensitive paper thus produced have a strong blue-violet color.

*Example 3*

2.4 gms. of 3-hydroxythiophene-5-carboxylic acid anilide are dissolved in 50 cc. of isopropanol. To this solution, 1.8 gms. of citric acid, 1.2 gms. of thiourea, 1.6 gms. of boric acid and 4 gms. of the zinc chloride double salt of 4-diazo-3-ethoxy-N diethyl-aniline are added and the total volume made up with water to 100 cc. A paper coated on one side with cellulose acetate lacquer is coated on the lacquered side with this solution. Exposure of the sensitized paper under a master and development of the dyestuff in the image parts by means of ammonia vapour is carried out in the conventional manner. Prints with strong blue lines are obtained.

3-hydroxy-thiophene-5-carboxylic acid anilide may be obtained as follows:

In a three-necker flask equipped with stirrer, dropping funnel and reflux condenser, 5 gms. of 3-hydroxy-thiophene-5-carboxylic acid are suspended in 70 cc. of absolute benzene with complete exclusion of water, 4.5 cc. of aniline are added with stirring and the reaction mixture is heated to boiling. 3.5 gms. of phosphorous trichloride in 35 cc. of anhydrous benzene are now added to the reaction mixture drop by drop. Heating and stirring are continued for 24 hours until the evolution of hydrogen chloride has practically ceased. The solid reaction product is separated by filtration with suction and digested with dilute sodium carbonate solution. By reprecipitation from an alcohol ether solution a light yellow product is obtained which has a melting point of 186–188° C.

If in the sensitizing solution given at the beginning of this example 1.6 g. of 3-hydroxythiophene-5-carboxylic acid methyl ester or
1.5 g. of 3-hydroxythiophene-5-carboxylic acid amide or
1.8 g. of 3-hydroxythiophene-5-carboxylic acid dimethylamide is used instead of 2.4 g. of 3-hydroxythiophene-5-carboxylic acid anilide, good prints are likewise obtained with strongly blue or blue-violet lines.

The 3-hydroxythiophene-5-carboxylic acid methyl ester is obtained if the free 3-hyroxythiophene-5-carboxylic acid is heated for two hours under a reflux condsenser with methanolic hydrochloric acid and the reaction mixture is then diluted with water, neutralized with sodium bicarbonate solution and extracted with ether. The ether is evaporated off. A residue is left which is dissolved in acetic ester and reprecipitated with petroleum-ether. The 3-hydroxythiophene-5-carboxylic acid methyl ester forms colourlesss crystals which melt at 86–87° C.

For the preparation of 3-hydroxythiophene-5-carboxylic acid amide and 3-hydroxythiophene-5-carboxylic acid dimethylamide, 3 - hydroxythiophene-5-carboxylic acid is converted into 3-acetoxy-thiophene-5-carboxylic acid and the acetylation product is treated with thionyl chloride. After removal of excess thionyl chloride, the reaction product is dissolved in ether, and the ethereal solution after being treated with animal charcoal, is used for the preparation of the carboxylic acid amide and the carboxylic acid dimethylamide respectively.

For the preparation of the carboxylic acid amide, gaseous ammonia is passed into the thereal solution. A solid mass precipitates out from which acetoxy-thiophene-carboxylic acid amide is obtained by ether extraction. It is treated with concentrated ammonia until complete solution takes place. When the solution is acidified with hydrochloric acid, 3-hydroxythiophene-5-carboxylic acid amide is precipitated, which, after being dissolved with acetic ester and reprecipitated with petroleum-ether, is obtained in the form of practically colourless crystals with a melting point of 134–135° C.

For the preparation of the carboxylic acid dimethylamide, the ethereal solution is shaken vigorously with 40% aqueous dimethylamine solution. An oil is precipitated which quickly solidifies; it is dissolved in dilute sodium hydroxide solution and reprecipitated from this solution with acid. The 3-hydroxythiophene-5-carboxylic acid dimethylamide is crystallized from acetic ester. Crystals of a slightly brown colour with a melting point of 148–149° are obtained.

Example 4

A solution is produced, containing, by weight, 0.5% of citric acid, 0.5% of aluminum sulphate, 0.4% of gelatine, and as a light-sensitive compound, 2% of the diazo compound from N-benzoyl-2,5-diethoxy-p-phenylene diamine in the form of the zinc chloride double salt. A paper base is coated using this solution. After the thus-sensitized paper has been dried it is exposed under a master and the exposed paper is developed by means of an aqueous solution consisting by weight of 1% 2-hydroxy-5-methyl-thiophene-3-carboxylic acid
10% tertiary sodium citrate
2% sodium benzoate
2% sodium adipate
0.2% adipic acid
6% common salt and
0.2% saponin The image obtained has a bright red colour.

Example 5

To a solution of 2.5 gms. of 5-phenyl-3-hydroxy-thiophene in 50 cc. of ispropanol are added 2 gms. of citric acid
1 gm. of thiourea
1.5 gms. of boric acid and
2 gms. of the zinc chloride double salt of 4-diazo-3-ethoxy-N-diethylaniline and the total volume is made up to 100 cc. with water. A paper coated on one side with cellulose acetate lacquer is coated on the lacquered side with this sensitizing solution. After drying, the sensitized paper is exposed under a master in normal manner and then developed with ammonia vapour. A copy of the master in a strong blue colour is obtained.

Example 6

To a solution of
3 gms. of citric acid
3 gms. of boric acid
5 gms. of thiourea and
5 gms. of naphthalene-1,3,6-trisulphonic acid sodium salt in 100 cc. of water 1.5 gms. of 2-hydroxy-5-methyl-thiophene-4-carboxylic acid and 2 gms. of zinc chloride double salt of 4-diazo-3-ethoxy-N-di-n-propylaniline are added. This sensitizing solution is applied to a paper which after drying is exposed in the usual way beneath a master and then developed with ammonia vapour. The print is in a strong blue colour with a slight violet tinge.

Having thus described the invention what is claimed is:

1. In a process for the reproduction of copies wherein a light sensitive diazo compound coated on a base material is exposed to light in a predetermined pattern to decompose the light sensitive diazo compound in the exposed areas, the step which comprises coupling the undecomposed diazo compound not exposed to light with a thiophene derivative which is substituted on the thiophene nucleus by at least one hydroxyl group and substituted on the thiophene nucleus by at least one organic radical selected from the groups consisting of phenyl, methyl, carboxyl, and salts, esters and amides of carboxyl.

2. In a process for the reproduction of copies wherein a light sensitive diazo compound coated on a base material is exposed to light in a predetermined pattern to decompose the light sensitive diazo compound in the exposed areas, the step which comprises coupling the undecomposed diazo compound not exposed to light with 3-hydroxy-thiophene-5-carboxylic acid.

3. In a process for the reproduction of copies wherein a light sensitive diazo compound coated on a base material is exposed to light in a predetermined pattern to decompose the light sensitive diazo compound in the exposed areas, the step which comprises coupling the undecomposed diazo compound not exposed to light with 3-hydroxy-thiophene-5-carboxylic acid amide.

4. In a process for the reproduction of copies wherein a light sensitive diazo compound coated on a base material is exposed to light in a predetermined pattern to decompose the light sensitive diazo compound in the exposed areas, the step which comprises coupling the undecomposed diazo compound not exposed to light with 3-hydroxy-thiophene-5-carboxylic acid anilide.

5. In a process for the reproduction of copies wherein a light sensitive diazo compound coated on a base material is exposed to light in a predetermined pattern to decompose the light sensitive diazo compound in the exposed areas, the step which comprises coupling the undecomposed diazo compound not exposed to light with 3-hydroxy-thiophene-5-carboxylic acid methyl ester.

6. In a process for the reproduction of copies wherein a light sensitive diazo compound coated on a base material is exposed to light in a predetermined pattern to decompose the light sensitive diazo compound in the exposed areas, the step which comprises coupling the undecomposed diazo compound not exposed to light with 2-hydroxy-5-methyl-thiophene-4-carboxylic acid.

7. Diazo type photoprinting material comprising a base material coated with a light sensitive layer including a light sensitive diazo compound and a thiophene derivative which is substituted on the thiophene nucleus by at least one hydroxyl group and substituted on the thiophene nucleus by at least one organic radical selected from the group consisting of phenyl, methyl, carboxyl, and salts, esters and amides of carboxyl.

8. Diazo type photoprinting material comprising a base material coated with a light sensitive layer including a light sensitive diazo compound and 3-hydroxy-thiophene-5-carboxylic acid.

9. Diazo type photoprinting material comprising a base material coated with a light sensitive layer including a light sensitive diazo compound and 3-hydroxy-thiophene-5-carboxylic acid amide.

10. Diazo type photoprinting material comprising a base material coated with a light sensitive layer including a light sensitive diazo compound and 3-hydroxy-thiophene-5-carboxylic acid anilide.

11. Diazo type photoprinting material comprising a base material coated with a light sensitive layer including a light sensitive diazo compound and 3-hydroxy-thiophene-5-carboxylic acid methyl ester.

12. Diazo type photoprinting material comprising a base material coated with a light sensitive layer including a light sensitive diazo compound and 2-hydroxy-5-methyl-thiophene-4-carboxylic acid.

13. In a process for the reproduction of copies wherein a light sensitive diazo compound coated on a base material is exposed to light in a predetermined pattern to decompose the light sensitive diazo compound in the exposed areas, the improvement which comprises treating the undecomposed diazo compound not exposed to light with an aqueous solution of a thiophene derivative which is substituted on the thiophene nucleus by at least one hydroxyl group and substituted on the thiophene nucleus by at least one organic radical selected from the group consisting of phenyl, methyl, carboxyl, and salts, esters and amides of carboxyl.

References Cited in the file of this patent

UNITED STATES PATENTS

| | | |
|---|---|---|
| 2,277,409 | Murray | Mar. 24, 1942 |
| 2,656,271 | Neugebauer et al. | Oct. 20, 1953 |

OTHER REFERENCES

Mitra et al.: J. of the Chem. Soc., 1939, p. 1117.
Fiesselmann et al.: Chemische Berichte, vol. 87, pp. 845–846.